United States Patent [19]

Bratt et al.

[11] 4,064,948

[45] Dec. 27, 1977

[54] POWER WRENCH

[75] Inventors: Sven Åke Bratt; Carl Åke Moberg, both of Tyreso, Sweden

[73] Assignee: Atlas Copco Aktiebolag, Nacka, Sweden

[21] Appl. No.: 666,586

[22] Filed: Mar. 15, 1976

[30] Foreign Application Priority Data

Mar. 18, 1975 Sweden ................................ 7503039

[51] Int. Cl.$^2$ ............................................ B23Q 5/027

[52] U.S. Cl. ........................................ 173/12; 192/150

[58] Field of Search ............... 173/12; 192/56 R, 150, 192/.034

[56] References Cited

U.S. PATENT DOCUMENTS

| | | | |
|---|---|---|---|
| 2,884,103 | 4/1959 | Connell | 192/56 R |
| 3,091,316 | 5/1963 | Huffman | 192/150 |
| 3,194,371 | 7/1965 | Rabinow | 192/150 |
| 3,240,304 | 3/1966 | Wickersham | 192/150 |
| 3,288,258 | 11/1966 | Taylor | 192/150 |
| 3,752,278 | 8/1973 | States | 192/150 |
| 3,807,539 | 4/1974 | Reed | 192/150 |

*Primary Examiner*—Robert A. Hafer
*Attorney, Agent, or Firm*—Flynn & Frishauf

[57] ABSTRACT

A power wrench in which an output shaft is powered by a motor via a magnetic torque responsive release clutch, and in which a torque non-responsive clutch is connected between the release clutch and the output shaft. Cam teeth which are associated with the release clutch halves are effective to inactivate the torque non-responsive clutch as the driving and driven halves of the latter, during increased torque load, have reached their fully released position. As the release clutch is unloaded there is an angular gap between the cam teeth corresponding to the relative angular displacement arising between the release clutch halves as the load on the release clutch is increased from zero to release level.

7 Claims, 4 Drawing Figures

POWER WRENCH

BACKGROUND OF INVENTION

This invention relates to a power wrench of the type having a torque responsive release clutch.

During tightening of screw joints a power wrench of this type is brought to deliver full power until the desired torque level is reached and the torque responsive clutch releases. Then, the power supply to the power wrench motor is interrupted, manually or automatically, whereby the motor is stopped. During the very last revolutions of the power wrench motor, the speed of relative rotation between the driving and the driven halves of the release clutch becomes slow enough to provide for reengagement of the clutch.

As the clutch finally reengages an undersirable jerk arises in the power wrench as the inertia of the motor rotor and the driving clutch half is transferred to the driven clutch half. Such a jerk is not only very annoying for the operator of hand held tools but it will also give rise to an undesirable torque addition in the screw joint being tightened.

These problems are solved by employing in power wrenches of the above type an inactivatable torque non-responsive clutch which is connected in series with the release clutch in order to completely disconnect the motor rotor from the power wrench output shaft as the desired torque level is reached.

In one prior art power wrench of this type the torque non-responsive clutch is located between the motor and the release clutch, which means that the inertia of the entire release clutch, after reengagement, is rotatively coupled to the output shaft. This is a serious drawback in that it results in a large mean shift, e.g. a big difference in final tightening torque between hard and soft joints.

In another prior art power wrench of this type, the torque non-responsive clutch is arranged to be shifted to its inactive position by one of the release clutch halves during disengagement of the release clutch. Such an arrangement is disadvantageous in that the torque non-responsive clutch is forced out of engagement under full torque load which gives rise to considerable frictional losses which in turn will cause the torque responsive clutch to release at an increased torque level.

The present invention intends to solve the above problems, which is accomplished by the power wrench defined in the claims.

BRIEF DESCRIPTION OF THE DRAWINGS

A preferred embodiment of the invention is hereinbelow described in detail with reference to the accompanying drawings, in which.

DETAILED DESCRIPTION

Figure 1A:
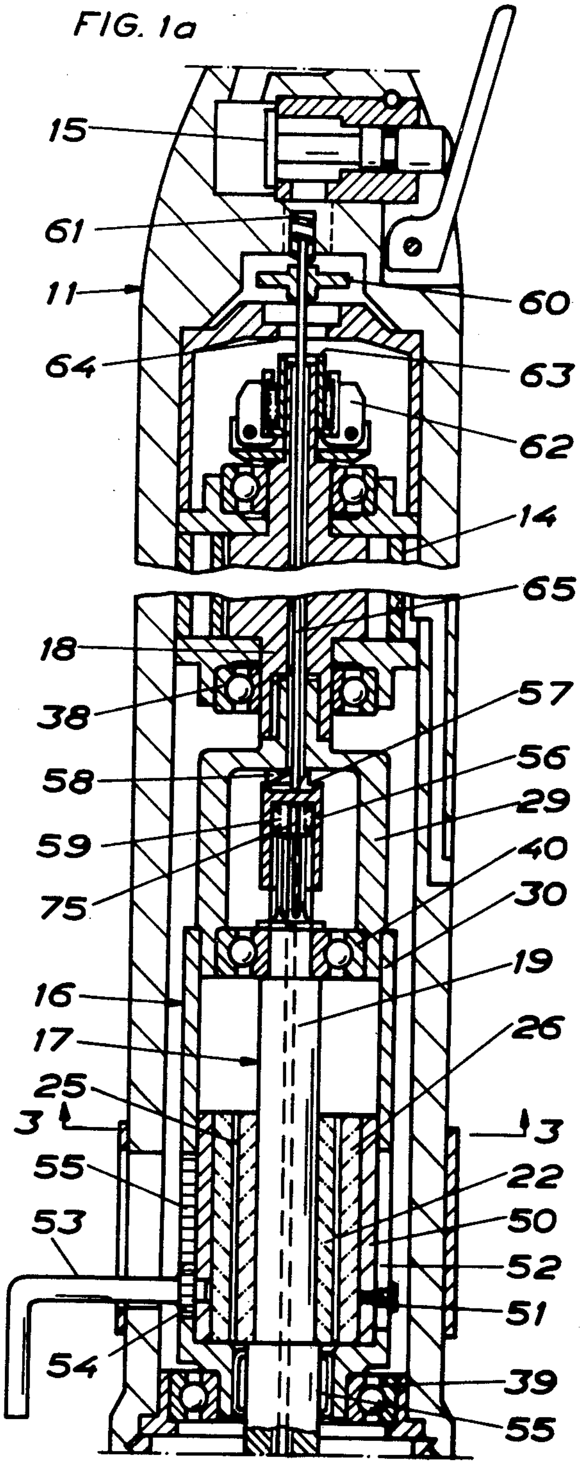
FIG. 1*a* shows a longitudinal section through the rear part of a power wrench according to the invention.
Figure 1B:
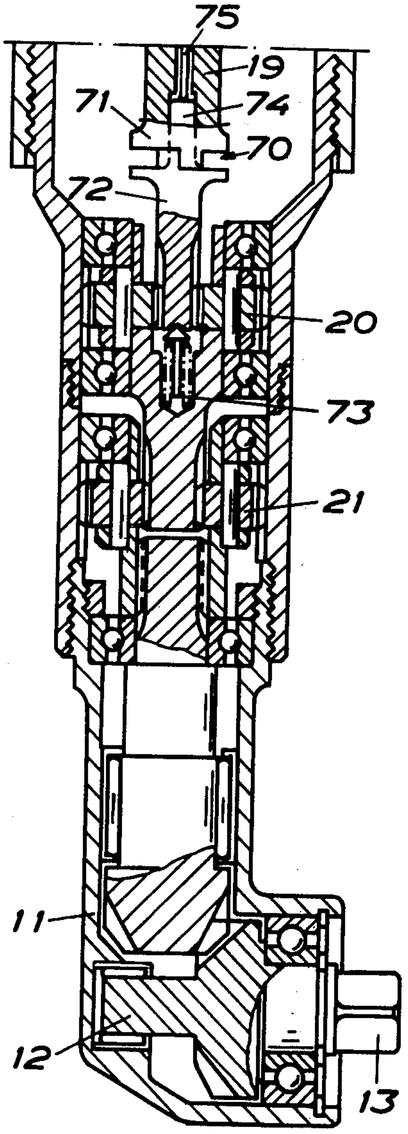
FIG. 1*b* shows a longitudinal section through the forward part of the power wrench in FIG. 1*a*.

The power wrench shown in the drawings comprises a housing 11 in which there is journalled an output shaft 12 which is formed with a square end 13 for receiving a nut socket. The power wrench comprises a pneumatic motor 14 of the sliding vane type and a manually activated control valve 15 for controlling the pressure air supply to the motor 14. Moreover, the power wrench is provided with a torque release clutch comprising of a driving clutch half 16 which is directly connected to the rotor shaft 18 of the motor, and a driven clutch half 17 connected to an intermediate shaft 19.

Between the clutch 16, 17 and the output shaft 12 there are connected in series two reduction gearings 20, 21 of the planetary type.

In the shown power wrench the motor 14 is provided with a centrifugal speed regulator. The speed regulator comprises a valve sleeve 63 which is operatively connected to centrifugal 62 so as to enter and choke up an inlet opening 64 in the housing as the rotation speed exceeds a previously determined value.

The clutch is of the magnetic field type and comprises an outer magnetic sleeve 26 connected to the driving clutch half 16 and an inner magnetic sleeve 22 connected to the driven clutch half 17. In this clutch the torque is transferred from the outer magnetic sleeve 26 to the inner magnetic sleeve 22 by the strength of magnetic fields existing across a tubular air gap 25.

Apart from the magnetic sleeve 26 the driving clutch half 16 comprises a rear type-shaped hub portion 29 which is rigidly connected to the shaft 18 of the motor 14. The driving clutch half 16 also comprises a forward tupe-shaped hub portion 30 and an axially displaceable bushing 50 in which the magnetic sleeve 26 is mounted. The rear and forward tupe-shaped hub portions 29 and 30 are rigidly interconnected and journalled relative to the housing 11 by means of bearings 38 and 39.

The forward hub portion 30 is provided with longitudinal slots 52 through which the bushing 50 is accessable for setting of a desired axial position thereof. The bushing 50 has a radial opening and the hub portion 30 has a rack of gear teeth 55 by which it is possible to displace the bushing 50 and the magnetic sleeve 26 axially by using a tool 53 provided with a spur gear 54. The bushing 50 can be locked in any desired axial position by means of screws 51 which extend out through the slots 52.

In the position, shown in FIG. 1*a*, the magnetic sleeve 26 encloses entirely the magnetic sleeve 22, whereby the clutch is set to transfer its maximum torque, load.

The driven clutch half 17 which comprises the intermediate shaft 19 and the inner magnetic sleeve 22 is journalled relative to the driving clutch half 16 and to the housing 11 by means of a rear ball bearing 40 and a forward needle bearing 55.

Figure 3:
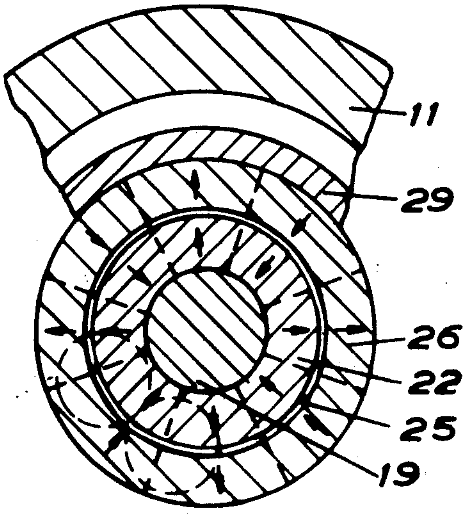
FIG. 3 shows, in larger scale, a fractional cross section along line 3—3 in FIG. 1*a*.

The magnetic sleeves 26 and 22 are permanently magnetized according to the pattern shown in FIG. 3 and will automatically occupy the positions shown in this figure as the clutch is unloaded.

Moreover, the clutch halves are provided with an interengagable cam means each comprising a tooth 57, 58 with a sloping face. The tooth 58 is rigidly attached to the hub portion 29 of the driving clutch half, whereas the tooth 57 of the driven clutch half is integral with an axially displaceable sleeve 56. The latter is formed with a rear end wall and is slidably coupled to the intermediate shaft 19 by a spline connection. The sleeve 56 is biased rearwardly by a spring 59 acting between the end wall of the sleeve and the rear end of the shaft 19. On the rear end of the sleeve 56 there is supported a valve rod 65 which is united with a valve member 60 disposed in the air inlet of the motor 14. The valve rod 65 extends through a central passage in the motor 14 and is loaded forwards by a spring 61 supported in the rear part of the housing.

The power wrench is provided with a torque non-responsive clutch 70 which is connected after the torque responsive magnetic clutch 16, 17 viewed in the direction of power transmission. The torque non-responsive clutch comprises two clutch halves 71 and 72 each of which is provided with interengagable axially extending dogs. The driving clutch half 71 is formed in one piece with the intermediate shaft 19, whereas the driven clutch half 72 is formed in one piece with the sun gear of reduction gearing 20.

The driven clutch half 72 is axially displaceable against the action of a spring 73 from an active position in which the dogs of the clutch halves is able to engage each other to an inactive position in which the dogs are prevented from interengagement. The driven clutch half is formed with a central rearwardly extending stub axle 74 which is rotatively received in a corresponding boring in the driving clutch half. The driven clutch half 72 is shiftable to its forward inactive position by means of a maneuver rod 75 which extends through a central passage in the intermediate shaft 19 between the rear end of the stub axle 74 and the end wall of the sleeve 56.

Figure 2:
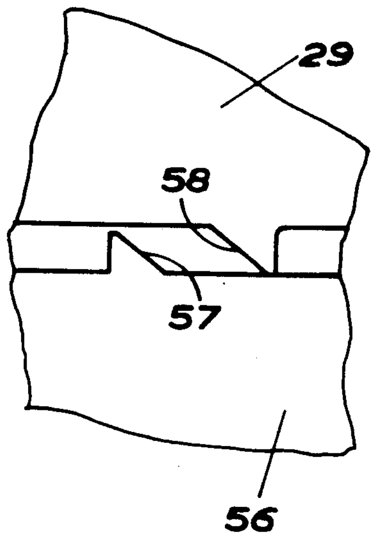
FIG. 2 shows, in larger scale, a fractional view of the torque non-responsive clutch of the power wrench in FIGS. 1*a* and *b*.

As illustrated in FIG. 2, the teeth 57, 58 of the cam means are so disposed relative to each other and relative to the torque responsive release clutch that, in the unloaded position of the release clutch, the teeth 57, 58 are situated at a distance from each other. This distance or gap is chosen so as to prevent interengagement of the teeth 57, 58 as long as the release clutch is transmitting any torque load. It is the intentional purpose to let the inactivation of the torque non-responsive clutch take place within an interval of relative rotation between the clutch halves of the release clutch in which no torque load is transmitted.

The relative positions of the release clutch halves shown in FIG. 3 is stable which means that the magnetic polarization of the driving magnetic sleeve 26 coincides completely with the magnetic polarization of the driven magnetic sleeve 22.

During increase in torque load on the driven clutch half the angular relationship between the clutch halves will change so that in about $\frac{1}{8}$ of a revolution the magnetic polarization or fields of the outer magnetic sleeve 26 and the inner magnetic sleeve 22 will be directly opposite. In this position, the clutch does not transfer any torque load. However, this position is non-stable and the relative turning of the clutch halves will continue for another $\frac{1}{8}$ of a revolution until a position in which the magnetic polarization of the sleeves 26 and 22 again coincides. So, when turning one of the clutch halves relative to the other between two stable positions a non-stable position will be passed in which no torque load can be transferred, and the gap between the teeth 57, 58 is chosen so as to correspond to the angular relative movement of the clutch halves between one stable position and an adjacent non-stable position as the clutch is in its rest position, e.g. $\frac{1}{8}$ of a revolution.

At displacement of the sleeve 56 there is accomplished, by action of the spring 61, an axial movement of the valve rod 65 and the valve member 60. Thereby, the latter will close the air inlet to the motor 14 and the power wrench is stopped. As the air supply to the motor is interrupted and no pressure drop exists across the valve 60, the maneuver rod 75 and the driven clutch half 72 of the torque non-responsive clutch 70 will move forwardly. The torque responsive clutch 16, 17 and the rotor of the motor 14 are completely separated from the output shaft 12 and the screw joint. As long as the control valve 15 is kept open, however, the pressure drop across the valve 60 will make the latter urge the sleeve 56, the maneuver rod 75 and the driven half 72 of the torque non-responsive clutch 70 forwardly, whereby the clutch 70 is retained in its inactive position.

By this arrangement the screw joint as well as the operator are prevented from jerks originating from the inertia of the motor and the driving clutch half at reengagement of the release clutch 16, 17. By disposing the torque non-responsive clutch 70 between the release clutch 16, 17 and the output shaft 12 the inertia of the non-releasable part of the power transmission is effectively reduced. By arranging the teeth 57, 58 at a relative angular distance, inactivation of the torque non-responsive clutch 70 is obtained as the release clutch (16, 17) is completely released, and because of that the dimensions as well as the inertia of the clutch 70 can be kept down.

Although, the described and shown power wrench comprises a magnetic clutch the invention is not limited thereto. The disclosed embodiment has been referred to in order to describe the invention by way of example and does not limit the scope of the invention.

What we claim is:

1. A power wrench comprising:

a motor (14), an output shaft (12) powered by said motor (14), a torque responsive release clutch (16, 17) comprising a driving half (16) and a driven half (17) and being located between said motor (14) and said output shaft (12), said release clutch halves (16, 17) being angularly displaceable relative to each other between an unloaded position and a released position, a disengageable torque non-responsive clutch (70) located between said release clutch (16,17) and said output shaft (12), cam means (57,58) non-rotatably connected to the halves of said release clutch (16,17) so as to interengage upon relative rotation of said release clutch halves, and a maneuver means (75) operatively connecting said cam means (57,58) to said torque non-responsive clutch (70) for disengaging said torque non-responsive clutch upon interengagement of said cam means (57,58), said cam means (57,58) being, when said release clutch (16,17) is unloaded, interspaced a distance substantially corresponding to the relative angular displacement of said release clutch halves (16,17) between said unloaded position and said released position, whereby said cam means (57,58) remains inactive until said release clutch halves have reached said released position.

2. A power wrench according to claim 1, wherein said cam means (57,58) comprises at least one tooth (57,58) with sloping faces connected to each of said halves of said release clutch, and wherein between the at least one tooth connected to one of said release clutch halves and the at least one tooth connected to the other of said release clutch halves there is a gap the width of which substantially corresponds to the relative angular displacement of the clutch halves that arises at increasing load on said release clutch (16,17) from zero to release level.

3. A power wrench according to claim 2, in which said release clutch (16,17) is a magnetic field type clutch, and comprising a cam sleeve (56) which is axially displaceable relative to said one of said release clutch halves upon interengagement of said cam teeth (57,58) for supporting said at least one cam tooth connected to said one of said release clutch halves (17).

4. A power wrench according to claim 3, wherein said torque non-responsive clutch (70) includes two halves, one of the halves (72) of said torque non-responsive clutch (72) being axially displaceable between an active position and an inactive position, and wherein said maneuver means (75) is arranged to transmit axial movement from said cam sleeve (56) to said one half (72) of said torque non-responsive clutch (70).

5. A power wrench according to claim 4, wherein said cam means (57,58) and said torque non-responsive clutch (70) are coaxially located, and wherein said maneuver means (75) comprises a push rod coaxially extending between said cam means (57,58) and said torque non-responsive clutch (70).

6. A power wrench according to claim 5, wherein said motor (14) is a pressure fluid motor having an inlet valve (60), said inlet valve (60) being coupled to said cam sleeve (56) so as to be shifted from an open position to a closed position as said cam teeth (57,58) interengage.

7. A power wrench comprising:

a motor, an output shaft powered by said motor, a torque responsive release clutch comprising a driving half and a driven half and being located between said output shaft and said motor, said release clutch halves being angularly displaceable relative to each other between an unloaded position and a release position, an inactivable torque non-responsive clutch connected between said release clutch and said output shaft, a first cam means associated with one of the halves of said release clutch, a second cam means associated with the other half of said release clutch and interengagable with said first cam means upon relative angular displacement of said clutch halves, a maneuver means operatively connecting said first cam means to said torque non-responsive clutch, said first and second cam means being disposed in such an angular relationship to said release clutch so as not to interengage, and by said maneuver means inactivate said torque non-responsive clutch until said release clutch attains its released position.

* * * * *